US012800868B2

(12) United States Patent
Chen et al.

(10) Patent No.: US 12,800,868 B2
(45) Date of Patent: Nov. 17, 2026

(54) LENS MODULE

(71) Applicant: Qisda Corporation, Taoyuan City (TW)

(72) Inventors: Hsin-Liang Chen, Taoyuan City (TW); Chun-Ming Shen, Taoyuan City (TW); Sheng-Wen Hu, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 215 days.

(21) Appl. No.: 18/806,733

(22) Filed: Aug. 16, 2024

(65) Prior Publication Data

US 2025/0093612 A1 Mar. 20, 2025

(30) Foreign Application Priority Data

Sep. 14, 2023 (CN) ......................... 202311186367.2

(51) Int. Cl.

| | |
|---|---|
| ***G02B 7/02*** | (2021.01) |
| ***F21V 5/00*** | (2018.01) |
| ***F21V 9/32*** | (2018.01) |
| ***F21V 23/00*** | (2015.01) |

(52) U.S. Cl.

CPC .............. *G02B 7/021* (2013.01); *F21V 5/008* (2013.01); *F21V 9/32* (2018.02); *F21V 23/004* (2013.01); *G02B 7/026* (2013.01); *G02B 7/028* (2013.01)

(58) Field of Classification Search

CPC ........ G02B 7/021; G02B 7/026; G02B 7/028; G02B 7/02; F21V 9/32; F21V 5/008; F21V 23/004; F21S 41/295; F21S 43/27

See application file for complete search history.

(56) References Cited

U.S. PATENT DOCUMENTS

2018/0216800 A1* 8/2018 Yamanaka ................ F21V 7/28
2023/0204178 A1* 6/2023 Ko ........................ F21S 41/265
362/516

FOREIGN PATENT DOCUMENTS

CN 203744051 U 7/2014
CN 214954298 U 11/2021

* cited by examiner

*Primary Examiner* — Angela M. Medich

(57) ABSTRACT

A lens module including an integrated lens holder and a lens group is provided. The lens holder is composed of a fixed piece and a lens frame. The lens frame is connected to the fixed piece. The lens frame includes an accommodating cavity and a bearing surface located in a periphery of the accommodating cavity. The lens group is disposed in the accommodation cavity and is supported on the bearing surface.

18 Claims, 5 Drawing Sheets

LENS MODULE

This application claims the benefit of People's Republic of China application Serial No. 202311186367.2, filed Sep. 14, 2023, the subject matter of which is incorporated herein by reference.

BACKGROUND OF THE INVENTION

Field of the Invention

The invention relates in general to a lens module.

Description of the Related Art

In order to improve the brightness of the vehicle's surrounding environment, most vehicles include a plurality of vehicle lights or light source assembly to provide forward lighting. In addition, integrating small projection devices into vehicle lights to project driving information has gradually become a design mainstream. Generally speaking, a vehicle light assembly includes a housing and a plurality of optical lens modules disposed inside the housing. The optical lens module includes a lens barrel and a lens group. In order to fix the optical lens module to the substrate, the lens assembly (or lens group) is usually combined with the lens barrel through positioning ribs or thermal melt glue, and then the lens barrel, the base and the substrate for heat dissipation are combined to ensure that there is no relative displacement between the lens assembly, the base and the substrate.

However, during the assembly process of the lens assembly, it is important to accurately fix the relative position of the lens and the solid-state light source.

SUMMARY OF THE INVENTION

The present invention relates to a lens module for accurately fixing the position of a lens and reducing the number of components.

According to one embodiment of the present invention, a lens module including an integrated lens holder and a lens group is provided. The lens holder is composed of a fixed piece and a lens frame. The lens frame is connected to the fixed piece. The lens frame includes an accommodating cavity and a bearing surface located in a periphery of the accommodating cavity. The lens group is disposed in the accommodation cavity and is supported on the bearing surface.

According to one embodiment of the present invention, a lens module including an integrated lens holder and a lens group is provided. The lens holder is composed of a heat sink and a lens frame. The lens frame is connected to the heat sink, and a slot is formed between a bottom surface of the lens frame and a top surface of the heat sink. The lens frame includes an accommodating cavity and a bearing surface located in a periphery of the accommodating cavity. The heat sink includes a plurality of heat dissipation fins. The lens group is arranged in the accommodation cavity and is supported on the bearing surface.

According to one aspect of the present invention, a lens module including an integrated lens holder and a lens group is provided. The lens holder is composed of a heat sink and a lens frame. The lens frame is connected to the heat sink, and a slot is formed between the bottom surface of the lens frame and the top surface of the heat sink. The lens frame includes an accommodating cavity and a bearing surface located in a periphery of the accommodation cavity, and the heat sink includes a plurality of heat dissipation fins. The lens group is arranged in the accommodation cavity and is supported on the bearing surface.

The above and other aspects of the invention will become better understood with regard to the following detailed description of the preferred but non-limiting embodiment(s). The following description is made with reference to the accompanying drawings.

DETAILED DESCRIPTION OF THE INVENTION

The technical solutions in the embodiments of the present application will be clearly and completely described below in conjunction with the accompanying drawings in the embodiments of the present application. Obviously, the described embodiments are only part of the embodiments of the present application, rather than all embodiments.

It should be noted that when an element is said to be "fixed" to another element, it can be directly on the other element or there may also be an intervening element therebetween. When an element is said to be "connected" to another element, it can be directly connected to the other element or there may also be an intervening element therebetween. When an element is said to be "disposed" on another element, it can be directly located on the other element or there may also be an intervening element therebetween.

Unless otherwise defined, all technical and scientific terms used herein have the same meaning as commonly understood by those skilled in the technical field belonging to this application. The terminology used herein in the description of the application is for the purpose of describing specific embodiments only and is not intended to limit the scope of the application.

Figure 1A:
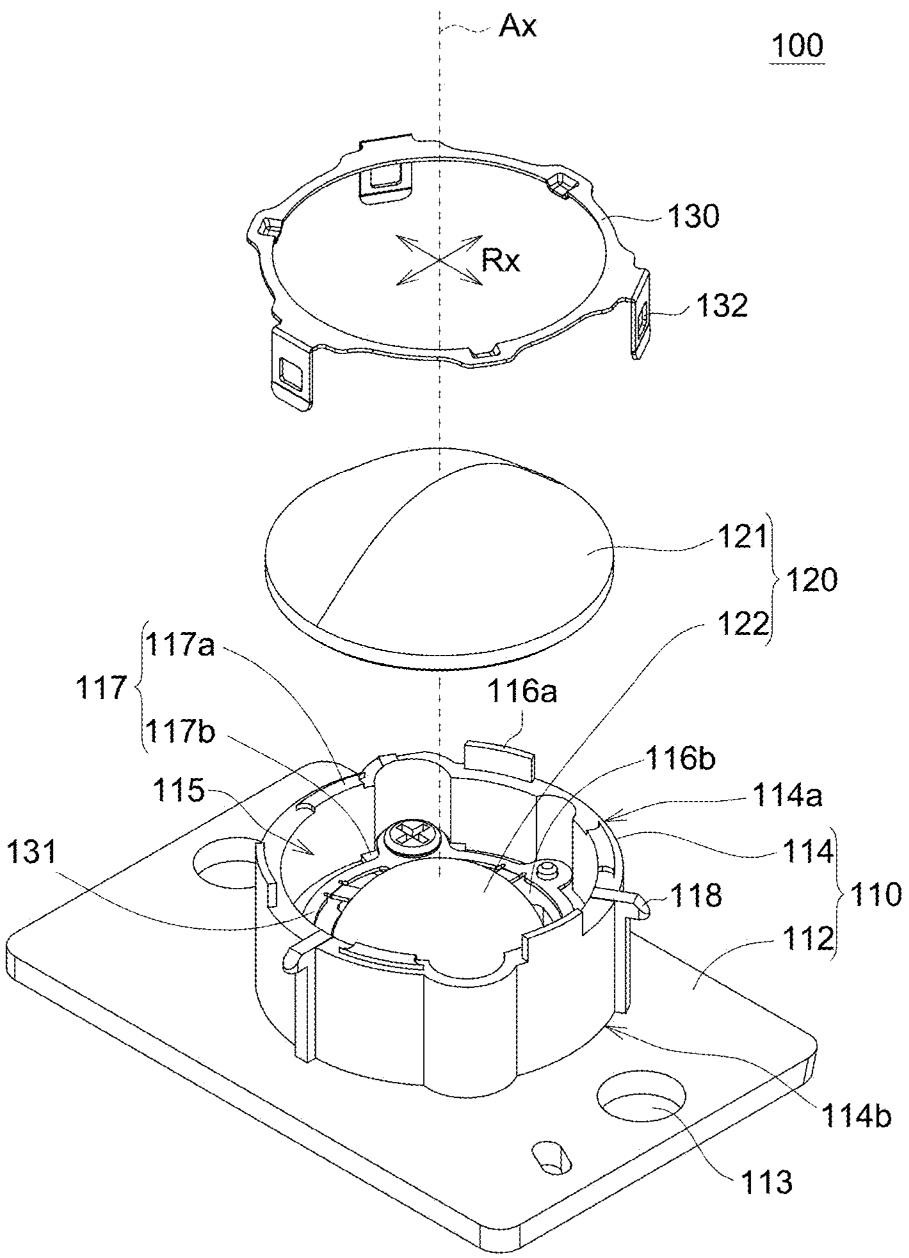
FIGS. 1A and 1B respectively illustrate an exploded view of a lens module according to one embodiment of the present invention and an exploded view of a lens module according to another embodiment of the present invention.
Figure 1B:
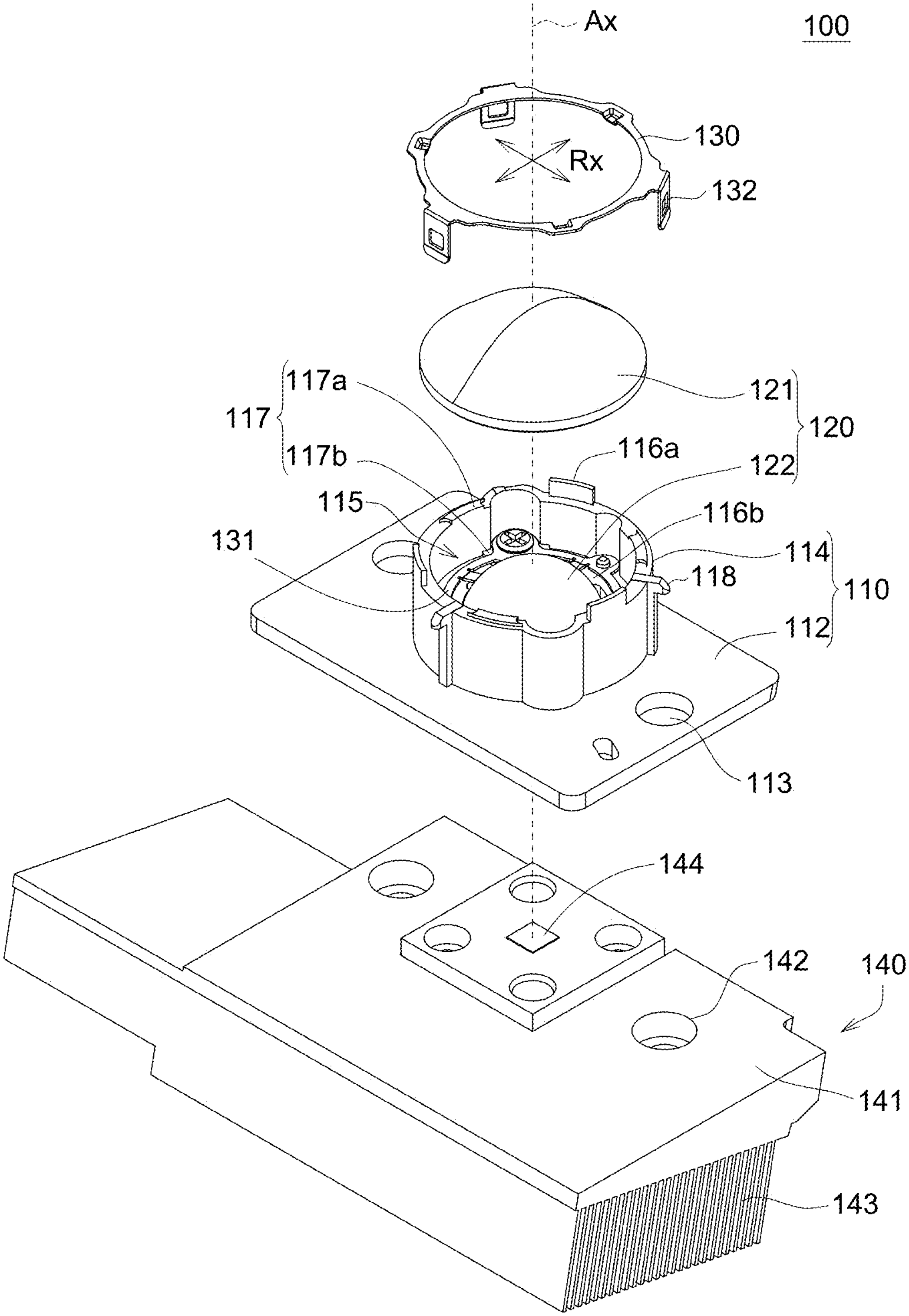

Refer to FIG. 1A and FIG. 1B. FIGS. 1A and 1B respectively illustrate an exploded view of a lens module 100 according to one embodiment of the present invention and an exploded view of a lens module 100 according to another embodiment of the present invention. The lens module 100 includes an integrated lens holder 110 and a lens group 120. The lens holder 110 is composed of a fixed piece 112 and a lens frame 114. The lens frame 114 is connected to the fixed piece 112. The lens frame 114 includes an accommodating cavity 115 and a bearing surface 117 located in the periphery of the accommodating cavity 115. The lens group 120 is disposed in the accommodation cavity 115 and is supported on the bearing surface 117.

Referring to FIG. 1A, the bearing surface 117 includes a first bearing surface 117_a_ and a second bearing surface 117_b_. The first bearing surface 117_a_ is located on the upper surface 114_a_ of the lens frame 114, and the second bearing surface 117_b_ is located on the lower surface 114_b_ of the lens frame

114 and protrudes toward the accommodation cavity 115. The first bearing surface 117*a* is located above the second bearing surface 117*b*, and the first bearing surface 117*a* and the second bearing surface 117*b* extend inward in a stepped manner, so that the two lenses 121 and 122 of the lens group 120 can be respectively supported on the first bearing surface 117*a* and the second bearing surface 117*b*.

Referring to FIG. 1A, the lens frame 114 may include a first positioning rib 116*a* and a second positioning rib 116*b*. The first positioning rib 116*a* is located on the first bearing surface 117*a* and extends along the axial direction Ax of the lens frame 114. The second positioning rib 116*b* is located in the radial direction Rx of the second bearing surface 117*b* and extends toward the accommodation cavity 115. The first positioning rib 116*a* is used to position one lens 121 of the lens group 120 on the first bearing surface 117*a*, and the second positioning rib 116*b* is used to position the other lens 122 of the lens group 120 on the second bearing surface 117*b*.

Figure 2:
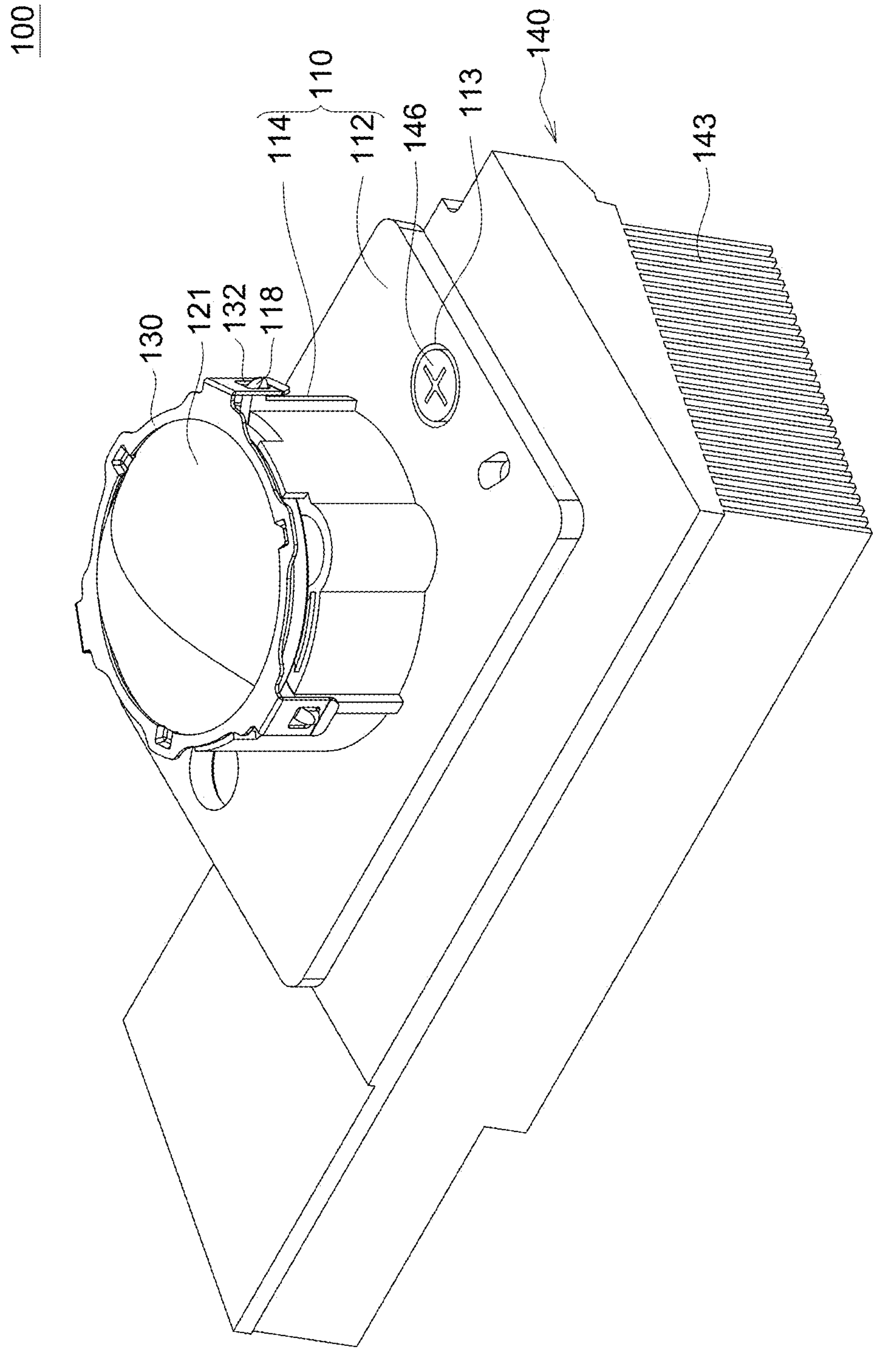
FIG. 2 is a schematic assembly diagram of a lens module according to an embodiment of the present invention.

In addition, refer to FIG. 1A and FIG. 1B. The lens module 100 may include a first fixed pressing piece 130 and a second fixed pressing piece 131, which are respectively disposed around the lens group 120. The first fixed pressing piece 130 is used to fix one lens 121 of the lens group 120 on the first bearing surface 117*a*, and the second fixing pressing piece 131 is used to fix the other lens 122 of the lens group 120 on the second bearing surface 117*b*. As shown in FIG. 1A, the first fixing pressing piece 130 is, for example, an annular fastener, the edge of the first fixing pressing piece 130 extends downward and has a fastening hole 132. The periphery of the lens frame 114 has, for example, a fastener 118, which protrudes from the lens frame 114 and opposite to the engaging hole 132. As shown in FIG. 2, when the engaging hole 132 of the first fixing pressing piece 130 is engaged with the fastener 118, the first fixing pressing piece 130 can fix the lens group 120 on the lens frame 114 to ensure that there will be no relative displacement between the lens group 120 and the lens frame 114.

In addition, the lens holder 110 is made, for example, through plastic injection molding or metal molding, to form a fixed piece 112 and a lens frame 114 integrated in a predetermined structure. The fixing piece 112 is, for example, a plate shape and has at least one first locking hole 113. The lens frame 114 is, for example, a barrel shape and has an opening (such as a central opening) at the bottom surface 114*b*. Since the lens holder 110 is an integrated structure, there will be no relative displacement between the fixed piece 112 and the lens frame 114. Therefore, it is possible to avoid the relative displacement of the conventional lens barrel and the base during the assembly process, which affects the alignment quality.

In addition, referring to FIG. 1B, the lens module 100 may include a heat sink 140, and the heat sink 140 includes a base plate 141, a second locking hole 142 and a plurality of heat dissipation fins 143. The heat sink 140 is disposed on a bottom surface of the fixed piece 112 to conduct heat to the heat sink fins 143 to accelerate cooling and heat dissipation. When the lens module 100 is assembled on the heat sink 140, the first locking hole 113 aligns with the second locking hole 142, so that the lens module 100 is accurately positioned on the heat sink 140 to avoid relative displacement during the assembly process, and thereby the alignment quality is improved. Refer to FIG. 2. In one embodiment, a fixing member 146 (such as a screw or similar object) is disposed in the first locking hole 113 and the second locking hole 142. The fixing member 145 is used to fix the lens module 100 on heat sink 140. In another embodiment, the lens module 100 can also be fixed on the heat sink 140 through thermal melt glue or light-curing glue, and the present invention is not limited thereto.

In addition, the lens module 100 may include a wavelength conversion element 144. The wavelength conversion element 144 is disposed in the accommodation cavity 115 to convert the wavelength of the incident light. The wavelength conversion element 144 can be a fluorescent material, for example, coated on the top surface of the heat sink 140 or attached to the heat sink 140. Referring to FIG. 1B, the bottom surface of the fixed piece 112 has an opening (not shown). The wavelength conversion element 144 is disposed on the heat sink 140 and can be exposed in the opening. The wavelength conversion element 144 is correspondingly located on the optical path of the lens group 120. When the light is incident into the accommodation cavity 115 through the lens group 120, the wavelength conversion element 144 receives the energy of the incident light to generate excitation light. The excitation light is emitted to the outside of the lens group 120 through the lens group 120 as an auxiliary light source.

In one embodiment, in the application field of vehicle light assemblies, the lens module 100 can be assembled in the vehicle light housing (not shown) and used to project driving information or auxiliary light sources to assist the driver grasp the driving information or road conditions in front of the vehicle. However, in another embodiment, the lens module 100 can also be used in a projector or other electronic devices, and the present invention is not limited thereto.

Figure 3:
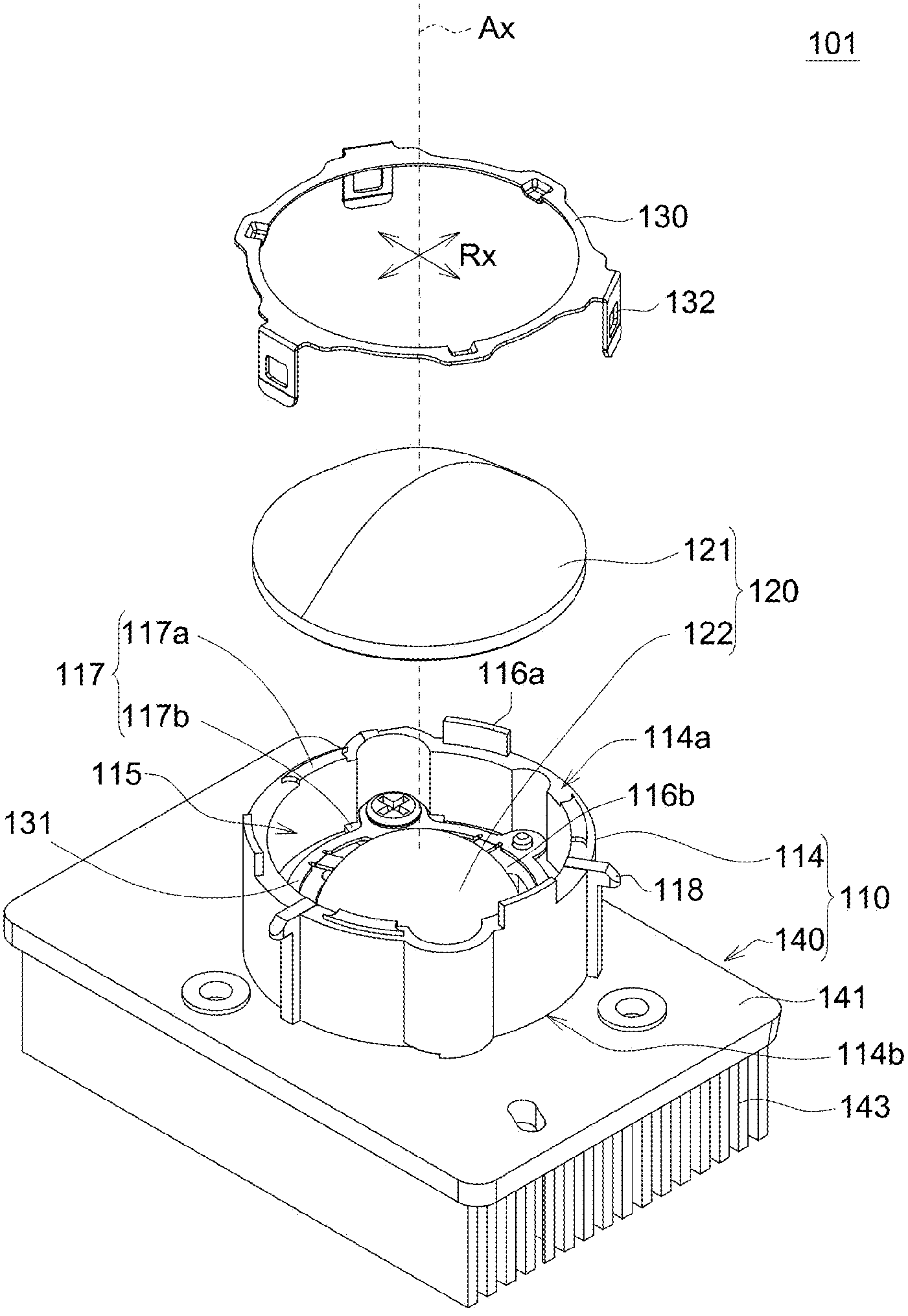
FIG. 3 is an exploded view of a lens module according to another embodiment of the invention.

Refer to FIG. 3. FIG. 3 is an exploded view of the lens module 101 according to another embodiment of the present invention. The lens module 101 includes an integrated lens holder 110 and a lens group 120. The lens holder 110 is composed of a heat sink 140 and a lens frame 114. The lens frame 114 is connected to the heat sink 140. The lens frame 114 includes an accommodating cavity 115 and a bearing surface 117 located in the periphery of the accommodating cavity 115. The heat sink 140 includes a base plate 141 and a plurality of heat dissipation fins 143. In addition, the lens group 120 is disposed in the accommodation cavity 115 and is supported on the bearing surface 117.

The difference between this embodiment and the above-mentioned embodiment is that the lens holder 110 is molded, for example, from metal or other materials to form the heat sink 140 and the lens frame 114 integrated in a predetermined structure. The heat sink 140 includes a base plate 141 connected to the lens frame 114 and a plurality of heat dissipation fins 143 disposed under the base plate 141 for conducting heat to accelerate cooling and heat dissipation. Since the heat sink 140 and the lens frame 114 do not need to be connected through the fixing piece 112 of FIG. 2, and the heat sink 140 and the lens frame 114 are directly connected without relative displacement, the relative displacement of the conventional lens barrel and the base or the heat dissipation substrate during the assembly process can be avoided, and thereby the alignment quality is improved.

The structures of the accommodating cavity 115, the bearing surface 117 and the buckle arrangement of the first/second fixed pressing pieces 130 and 131 have been described in the above embodiments. Components with the same function are represented by the same or similar reference symbols, and do not repeat here.

In addition, the lens module 101 may include a wavelength conversion element 144, which is configured as shown in FIG. 1B. The wavelength conversion element 144 is disposed in the accommodation cavity 115 to convert the wavelength of the incident light. The wavelength conversion element 144 can be a fluorescent material, for example, coated on the top surface of the heat sink 140 or attached to the heat sink 140. The fluorescent materials can be irradiated by light of a certain wavelength (such as ultraviolet rays or x-rays) and absorb energy, then release light of another longer wavelength (usually visible light), which is visible fluorescence or excitation light. The fluorescent material may include inorganic luminescent particles made of yttrium aluminum garnet (YAG), which has a higher melting point than organic particles. Therefore, even when the inorganic light-emitting particles are irradiated with high energy or exposed at high temperatures, the inorganic light-emitting particles are not easily damaged by thermal shock. In some embodiments, inorganic luminescent particles can withstand high-power irradiation of light (such as laser blue light) and have higher thermal conductivity than organic materials, so that the wavelength conversion element 144 has better thermal resistance.

In another embodiment, the fluorescent material may also include organic luminescent materials or white functional particles to adjust the scattering path of the excitation light. The white functional particles can be made of aluminum oxide ($Al_2O_3$), titanium oxide ($TiO_2$), zinc oxide (ZnO), zirconium oxide ($ZrO_2$), tantalum oxide ($Ta_2O_5$) or other appropriate materials.

Figure 4:
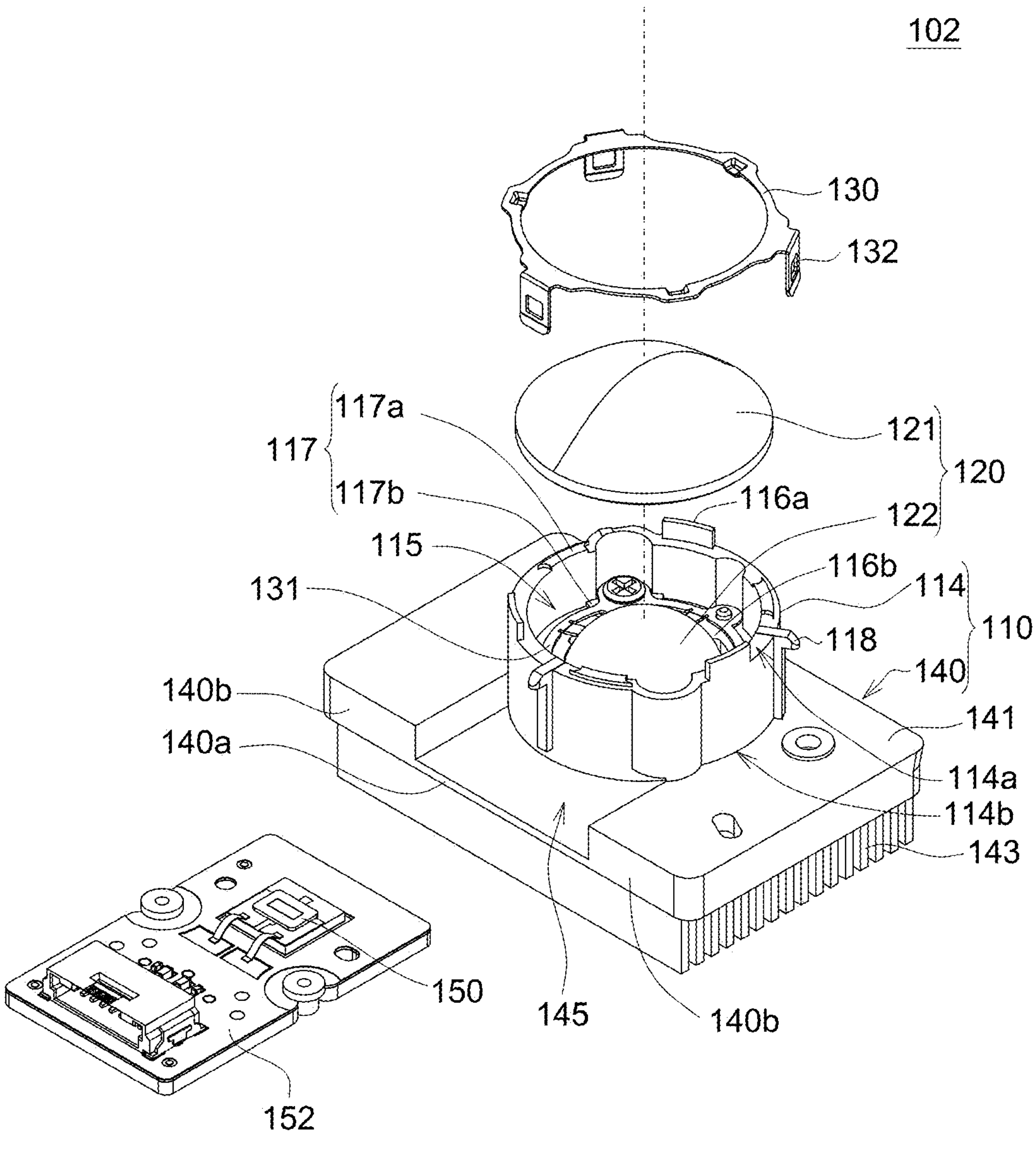
FIG. 4 is an exploded view of a lens module according to another embodiment of the invention.

Refer to FIG. 4. FIG. 4 shows an exploded view of the lens module 102 according to another embodiment of the present invention. The lens module 102 includes an integrated lens holder 110 and a lens group 120. The lens holder 110 is composed of a heat sink 140 and a lens frame 114. The lens frame 114 is connected to the heat sink 140, and there is a slot 145 between the bottom surface 114*a* of the lens frame 114 and the top surface of the heat sink 140 (i.e., base plate 141). The lens frame 114 includes an accommodating cavity 115 and a bearing surface 117 located in the periphery of the accommodating cavity 115. The heat sink 140 includes a plurality of heat dissipation fins 143. In addition, the lens group 120 is disposed in the accommodation cavity 115 and is supported on the bearing surface 117.

The difference between this embodiment and the above-mentioned embodiments is that there is a slot 145 between the heat sink 140 and the lens frame 114, so that the bottom surface 114*a* of the lens frame 114 and the top surface of the heat sink 140 are separated by a predetermined distance. As shown in FIG. 4, the lens holder 110 is, for example, molded from metal or other materials to form the heat sink 140, the lens frame 114 and the slot 145 integrated in a predetermined structure. In the appearance of the heat sink 140, the thickness of the central portion 140*a* of the heat sink 140 is thinner, and the thickness of the two outer portions 140*b* of the heat sink 140 is thicker, so that the center of the base plate 141 of the heat sink 140 forms a notch shape, and the lens frame 114 bridges over the slot 145 and is connected between the two thicker outer portions 140*b*. Therefore, a slot 145 is formed between the bottom surface 114*b* of the lens frame 114 and the top surface of the heat sink 140 (i.e., base plate 141).

Since the heat sink 140 and the lens frame 114 do not need to be connected by the fixing piece 112, and the heat sink 140 and the lens frame 114 are directly connected without relative displacement, the relative displacement of the conventional lens barrel and the base or the heat dissipation substrate during the assembly process can be avoided, and thereby the alignment quality is improved.

In one embodiment, the shape of the slot 145 is, for example, elongated or flat, and is used to accommodate an electronic device. The electronic device may be an optical element or an image sensing element, and the invention is not limited thereto. Referring to FIG. 4, the electronic device may include a light source module 150 and a circuit board 152. The light source module 150 is disposed on the circuit board 152, and the light source module 150 and the circuit board 152 are disposed in the slot 145. In one embodiment, the light source module 150 is, for example, a solid-state light source or one of other types of light-emitting sources. The solid-state light source is, for example, a light-emitting diode for generating a projection light or a light signal. In addition, a control chip (not shown) can be disposed on the circuit board 152 to provide voltage signals and control signals required by the light source module 150 to control the light source module 150 to generate a projection light or a light signal.

In addition, the circuit board 152 can be fixed on the heat sink 140 through screws or other means, and the heat generated by the light source module 150 is conducted to the heat sink 143 through the heat sink 140 to accelerate cooling and heat dissipation.

In one embodiment, in the application field of vehicle light assemblies, the lens module 102 and the light source module 150 are combined into an electronic component and can be assembled in the vehicle light housing to project driving information or to be auxiliary light sources to help the driver grasp the driving information or road conditions in front of the vehicle. However, in another embodiment, the lens module 102 and the light source module 150 can also be used in projectors or other electronic devices, and the present invention is not limited thereto.

The structures of the accommodating cavity 115, the bearing surface 117 and the buckling arrangements of the first/second fixed pressing pieces 130 and 131 have been described in the above embodiments. Components with the same function are represented by the same or similar reference symbols and do not repeat here.

The lens module according to the above embodiment of the present invention can fix the lens group in the accommodating cavity of the lens frame to ensure that there will be no relative displacement between the lens group and the lens frame. In addition, since the lens holder is an integrated structure, the number of components of the lens holder is reduced, and there is no relative displacement between the fixed piece and the lens frame, or the heat sink and the lens frame are directly connected without relative displacement, so that the relative displacement of the conventional lens barrel and the base or the heat dissipation substrate during the assembly process can be avoided, and thereby the alignment quality is improved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens module, comprising:

an integrated lens holder, composed of a fixed piece and a lens frame, the lens frame being connected to the fixed piece, the lens frame including an accommodating cavity and a bearing surface located in a periphery of the accommodating cavity; and a lens group disposed in the accommodating cavity and being supported on the bearing surface, wherein the bearing surface comprises a first bearing surface and a second bearing surface, the first bearing surface is located on an upper surface of the lens frame, and the second bearing surface is located on a lower surface of the lens frame and protrudes toward the accommodation cavity.

2. The lens module of claim 1, further comprising a heat sink disposed on a bottom surface of the fixed piece, and the heat sink comprising a plurality of heat dissipation fins.

3. The lens module of claim 2, further comprising a wavelength conversion element disposed on the heat sink and exposed in the accommodation cavity.

4. The lens module of claim 3, wherein the wavelength conversion element includes a fluorescent material.

5. The lens module of claim 3, wherein the wavelength conversion element is coated on a top surface of the heat sink or attached to the top surface the heat sink.

6. The lens module of claim 2, wherein the fixed piece comprises a first locking hole, the heat sink comprises a second locking hole, and the first locking hole is corresponding to the second locking hole.

7. The lens module of claim 6, further comprising a fixing member disposed in the first locking hole and the second locking hole.

8. The lens module of claim 1, further comprising a fixed pressing piece disposed around the lens group, and the fixed pressing piece being configured to fix the lens group in the accommodation cavity.

9. The lens module of claim 1, wherein the lens frame comprises a first positioning rib and a second positioning rib, the first positioning rib is located on the first bearing surface and extends along an axial direction of the lens frame, and the second positioning rib is located in an radial direction of the second bearing surface and extends toward the accommodation cavity.

10. A lens module, comprising:

an integrated lens holder, composed of a heat sink and a lens frame, the lens frame being connected to the heat sink, the lens frame comprising an accommodating cavity and a bearing surface located in a periphery of the accommodating cavity, the heat sink comprising a plurality of heat dissipation fins; and a lens group disposed in the accommodating cavity and being supported on the bearing surface, wherein the bearing surface comprises a first bearing surface and a second bearing surface, the first bearing surface is located on an upper surface of the lens frame, and the second bearing surface is located on a lower surface of the lens frame and protrudes toward the accommodation cavity.

11. The lens module of claim 10, further comprising a fixed pressing piece disposed around the lens group, and the fixed pressing piece being configured to fix the lens group in the accommodation cavity.

12. The lens module of claim 10, further comprising a wavelength conversion element disposed on the heat sink and exposed in the accommodation cavity.

13. The lens module of claim 12, wherein the wavelength conversion element comprises a fluorescent material.

14. The lens module of claim 12, wherein the wavelength conversion element is coated on a top surface of the heat sink or attached to the top surface the heat sink.

15. The lens module of claim 11, wherein the lens frame comprises a first positioning rib and a second positioning rib, the first positioning rib is located on the first bearing surface and extends along an axial direction of the lens frame, and the second positioning rib is located in an radial direction of the second bearing surface and extends toward the accommodation cavity.

16. A lens module, comprising:

an integrated lens holder, composed of a heat sink and a lens frame, the lens frame being connected to the heat sink, and a slot being formed between a bottom surface of the lens frame and a top surface of the heat sink, the lens frame comprising an accommodating cavity and a bearing surface located in a periphery of the accommodating cavity, and the heat sink comprising a plurality of heat dissipation fins; and a lens group disposed in the accommodating cavity and being supported on the bearing surface, wherein the bearing surface comprises a first bearing surface and a second bearing surface, the first bearing surface is located on an upper surface of the lens frame, and the second bearing surface is located on a lower surface of the lens frame and protrudes toward the accommodation cavity.

17. The lens module of claim 16, further comprising a light source module and a circuit board, the light source module being disposed on the circuit board, and the light source module and the circuit board being disposed in the slot.

18. The lens module of claim 16, further comprising a fixed pressing piece disposed around the lens group, and the fixed pressing piece being configured to fix the lens group in the accommodation cavity.

* * * * *